US010963587B1

United States Patent
Namjoshi et al.

(10) Patent No.: US 10,963,587 B1
(45) Date of Patent: Mar. 30, 2021

(54) USER ACTION COLLECTION FOR SENSITIVE CUSTOMER DATA

(71) Applicant: Workday, Inc., Pleasanton, CA (US)

(72) Inventors: Parag Avinash Namjoshi, Foster City, CA (US); Harikrishna Narayanan, Alameda, CA (US); Sergei Winitzki, San Francisco, CA (US); Yury Markovsky, San Francisco, CA (US); Lakshminarayanan Renganarayana, Alameda, CA (US)

(73) Assignee: Workday, Inc., Pleasanton, CA (US)

( * ) Notice: Subject to any disclaimer, the term of this patent is extended or adjusted under 35 U.S.C. 154(b) by 185 days.

(21) Appl. No.: 16/007,319

(22) Filed: Jun. 13, 2018

(51) Int. Cl.
| | |
|---|---|
| *G06F 21/62* | (2013.01) |
| *G06K 9/62* | (2006.01) |
| *H04L 29/08* | (2006.01) |
| *G06N 20/00* | (2019.01) |
| *G06F 16/903* | (2019.01) |

(52) U.S. Cl.
CPC .... *G06F 21/6245* (2013.01); *G06F 16/90335* (2019.01); *G06K 9/623* (2013.01); *G06N 20/00* (2019.01); *H04L 67/22* (2013.01)

(58) Field of Classification Search
CPC .......... G06F 21/6245; G06F 16/90335; G06F 21/602; G06N 20/00; G06K 9/623; H04L 67/22; H04L 63/04; H04L 9/008; H04L 63/0428; G06Q 40/08
See application file for complete search history.

(56) References Cited

U.S. PATENT DOCUMENTS

| | | | |
|---|---|---|---|
| 10,250,455 B1* | 4/2019 | Moniz | H04L 41/5045 |
| 2014/0123159 A1* | 5/2014 | Phillips | H04N 21/2541 725/1 |
| 2014/0372752 A1* | 12/2014 | Sallis | G06F 21/32 713/165 |
| 2015/0170292 A1* | 6/2015 | Fung | A61B 5/0205 705/51 |
| 2015/0181505 A1* | 6/2015 | Deng | H04W 72/005 713/160 |
| 2016/0117436 A1* | 4/2016 | Ng | G06F 30/327 716/113 |
| 2017/0124487 A1* | 5/2017 | Szeto | G06Q 30/0204 |
| 2017/0149631 A1* | 5/2017 | Brown | H04L 67/02 |
| 2018/0255023 A1* | 9/2018 | Whaley | H04L 63/0421 |
| 2018/0359078 A1* | 12/2018 | Jain | G06F 21/602 |
| 2019/0050444 A1* | 2/2019 | Benke | G06F 16/254 |
| 2019/0238429 A1* | 8/2019 | Chanda | H04L 43/04 |

* cited by examiner

*Primary Examiner* — Muhammad Raza
(74) *Attorney, Agent, or Firm* — Van Pelt, Yi & James LLP

(57) ABSTRACT

A secure tenant activity data system for a deployment service includes an interface and a processor. The interface is configured to receive a set of encrypted monitoring data collected and encrypted from a monitoring instrument from a tenant system. The processor is configured to decrypt the data for stream processing; encrypt and store the stream processed data; and provide the encrypted data with a tenant identifier to a deployment service. Steam processing is one or more of data cleaning, data rounding, data filtering, data smoothing, algorithmic processing, improving ranking of results, improved navigation, generating recommendations, generating metrics, or computation of features for a machine learning system.

15 Claims, 8 Drawing Sheets

USER ACTION COLLECTION FOR SENSITIVE CUSTOMER DATA

BACKGROUND OF THE INVENTION

Multitenant computing systems commonly store tenanted user data (e.g., private data associated with a tenant) for a plurality of tenants. Tenanted user data is not accessible to users associated with other tenants, nor to users or administrators associated with the multitenant computing system provider. Tenanted user data typically comprises data describing a user, for example, name, age, address, salary, supervisor, performance ratings, etc. Computing systems commonly collect user data and analyze the user data to predict user needs and serve users better. For example, a movie recommendations website collects data describing movies a user has viewed, whether the movies were finished, whether related movies were viewed, etc., and uses the data to build a model that is able to predict movies it believes the users will like. A search engine collects data describing search queries, search results, which search results were selected by the user, etc., and uses the data to improve the search engine. This data most typically takes the form of monitoring data, not tenant data. Monitoring data is not commonly stored as tenanted user data, creating a problem when the information stored describes private users and is required to be stored privately.

BRIEF DESCRIPTION OF THE DRAWINGS

Various embodiments of the invention are disclosed in the following detailed description and the accompanying drawings.

DETAILED DESCRIPTION

Figure 1:
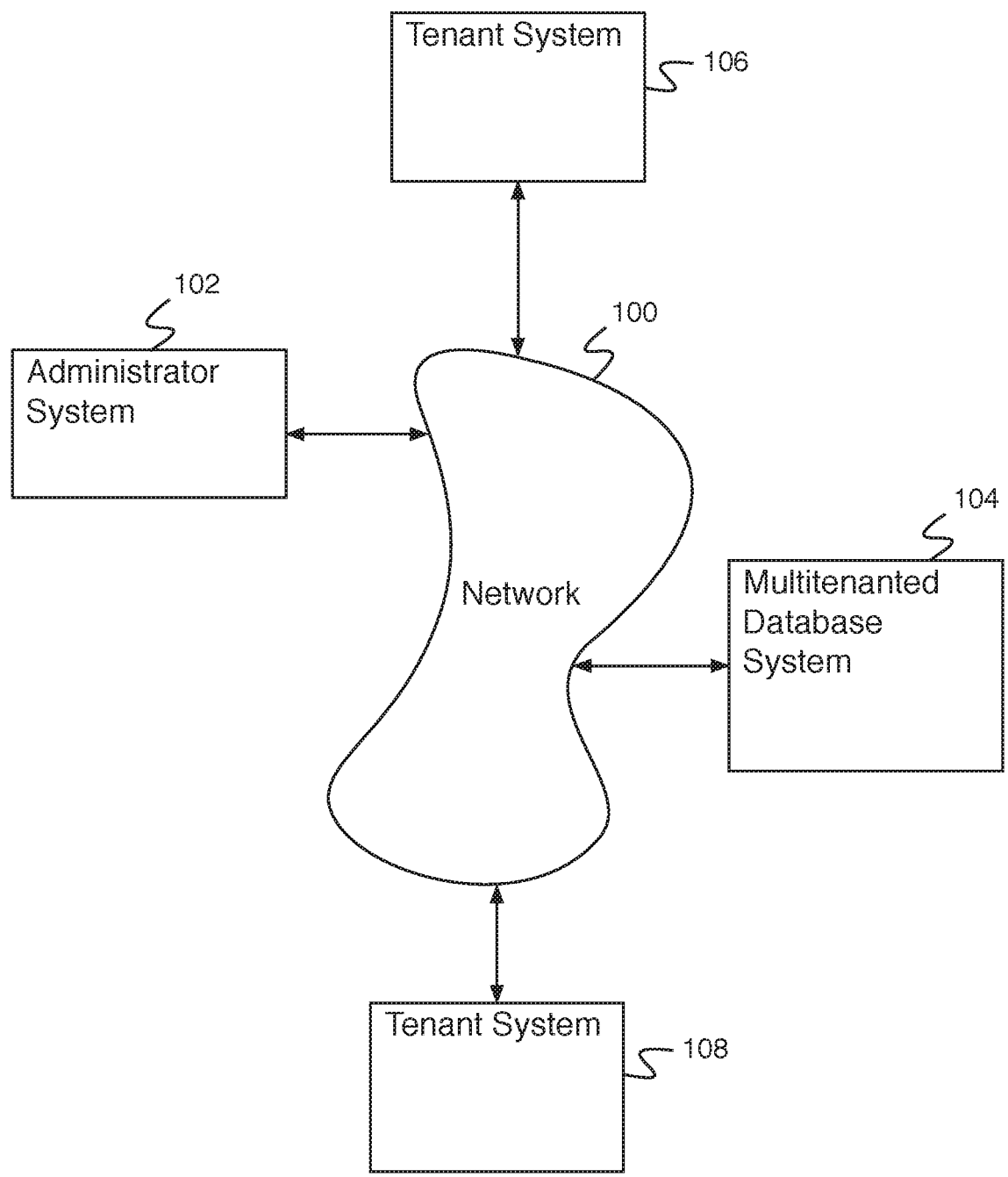
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A secure tenant activity data system for a deployment service is disclosed. The system comprises an interface and a processor. The interface is configured to receive a set of encrypted monitoring data, wherein a monitoring instrument collects a set of monitoring data from a tenant system, and wherein the monitoring instrument encrypts the set of monitoring data to create the set of encrypted monitoring data. The processor is configured to decrypt the set of encrypted monitoring data for stream processing to recover the set of monitoring data, stream process the set of monitoring data to generate a set of stream processed monitoring data, wherein stream processing comprises one or more of data cleaning, data rounding, data filtering, data smoothing, algorithmic processing, or computation of features for a machine learning system; encrypt the set of stream processed monitoring data to create a set of encrypted stream processed monitoring data, store the set of encrypted stream processed monitoring data in a secure storage area, wherein a tenant identifier is stored associated with the set of encrypted monitoring data; and provide the set of encrypted stream processed monitoring data and the tenant identifier to a deployment service.

A secure tenant activity data system for a deployment service extracts monitoring data (e.g., data tracking a user's interactions with tenanted system) from a database system and processes the monitoring data (e.g., user interaction data) in a secure way to provide the data to a deployment service (e.g., an analysis engine, a machine learning model builder, etc.). The system extracts monitoring data using a set of monitoring instruments within the database system. Instrumentation modules are installed on systems that generate or process data (e.g., a user interface system, an object read system, an object write system, etc.) as well as on inter-system communications. A monitoring instrument collects a set of monitoring data from a tenant system, encrypts the set of monitoring data (e.g., using an encryption key—for example, a tenant specific encryption key) to create a set of encrypted monitoring data, and provides the set of encrypted monitoring data to the secure tenant activity data system. A monitoring instrument can additionally inject a transaction identifier into a transaction when a transaction begins (e.g., in a user interface system) that is carried through and identified by one or more monitoring instruments in other systems. For example, the transaction identifier can be used to correlate a search query with search results and with user selections of search results.

Modules within the secure tenant activity data system have access to encryption keys to decrypt the data, however, no unauthorized users, administrators, etc. have access to these keys, preventing anyone from accessing the tenanted log data. The secure tenant activity data system receives the set of data in a data stream and decrypts the set of encrypted data to recover the set of monitoring data for stream processing. The set of monitoring data is then stream processed to generate a set of stream processed monitoring data. Stream processing comprises one or more of data cleaning, data rounding, data filtering, data smoothing, algorithmic processing, computation of features for a machine learning system, improving ranking of results, improved navigation, generating recommendations, generating metrics, or any other appropriate stream processing. The stream processed monitoring data is then encrypted to generate a set of encrypted stream processed monitoring data. The set of encrypted stream processed monitoring data is stored in a secure storage system associated with a tenant identifier, and the set of encrypted stream processed monitoring data and the tenant identifier are provided to a deployment service. The deployment service comprises a machine learning model builder, a neural network training system, an algorithm for determining commonly indicated user choices, etc. The secure tenant activity data system improves the multi-tenant computing system by allowing the processing of monitoring data associated with a tenant utilizing the same secure tenant activity data model that is typically applied to tenanted user data. For the secure tenant activity data model, the data is encrypted on transmission and storage and only made available for processing (e.g., stream processing, search, etc.). Only users with appropriate privileges are allowed access to data. The system improves the computing system by maintaining security for not only tenant data, but also for data derived from tenant data or tenant actions (e.g., log data, response data, action data, etc.).

FIG. 1 is a block diagram illustrating an embodiment of a network system. In some embodiments, the network system of FIG. 1 comprises a secure tenant activity data system for a deployment service. In the example shown, tenant system 106 and tenant system 108 store data on separate tenanted areas of multitenanted database system 104. Multitenanted database system 104 comprises a plurality of tenanted areas, each associated with a tenant comprising one or more tenant systems. Data stored in a tenanted area is only accessible to users and systems associated with the tenant and is not accessible to users or systems associated with other tenants or to administrators associated with multitenanted database system 104 (e.g., administrators accessing multitenanted database system 104 via administrator system 102). Administrator system 102 is able to administrate different components of the system including multitenanted database system 104.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, multitenanted database system 104, tenant system 106, and tenant system 108 communicate via network 100. Administrator system 102 comprises an administrator system for use by an administrator. Administrator system 102 comprises an administrator system for executing administrator commands, for configuring multitenanted database system 104, etc. Multitenanted database system 104 comprises a database system for providing tenant user access to data stored in a tenanted area of multitenanted database system 104 (e.g., access to add data, view data, modify data, delete data, access reports, execute business processes, etc.). Tenant system 106 and tenant system 108 comprise tenant systems for use by tenant users. A tenant user uses a tenant system to interact with multitenanted database system 104, for example to store database data, to request database data, to request reporting based on database data, to request creation of a model based on database data, to use a model based on database data, etc. In some embodiments, the network system of FIG. 1 comprises a plurality of tenant systems associated with one or more tenants.

A tenant user using a tenant system interacts with multitenanted database system 104 to view and/or interact with tenant data, to generate reports, to perform searches, to enter employee data, to view training videos, etc. As the tenant user interacts with multitenanted database system 104, tenanted data is read, written, modified, etc. In addition, monitoring data describing user actions is created. Monitoring instruments installed on one or more systems of multitenanted database system 104 capture monitoring data describing the user actions and encrypt the monitoring data to protect it from being accessed by any unauthorized users (e.g., users associated with other tenants, users or administrators associated with multitenanted database system 104, etc.). The encrypted monitoring data is provided to a secure tenant activity data system for processing monitoring data using a secure tenant activity data model. The secure tenant activity data system receives the encrypted monitoring data and processes the encrypted monitoring data using a stream processing system. The stream processing system comprises a system for processing the monitoring data, for example, cleaning the data, filtering the data, smoothing the data, rounding the data, processing the data using an algorithm, computing features for machine learning, etc. The stream processing system receives the encrypted monitoring data, decrypts the encrypted monitoring data to recover the monitoring data for stream processing, stream processes the monitoring data to determine stream processed monitoring data, and encrypts the monitoring data to determine encrypted stream processed monitoring data. The encrypted stream processed monitoring data is stored in a secure storage area of the secure tenant activity data system associated with a tenant identifier (e.g., identifying the tenant from which the data originated). The encrypted stream processed monitoring data is additionally provided to a deployment system for further processing. The deployment system comprises a machine learning model builder, a neural network training system, a recently used data determiner, an explicit algorithm, or any other appropriate deployment system.

Figure 2:
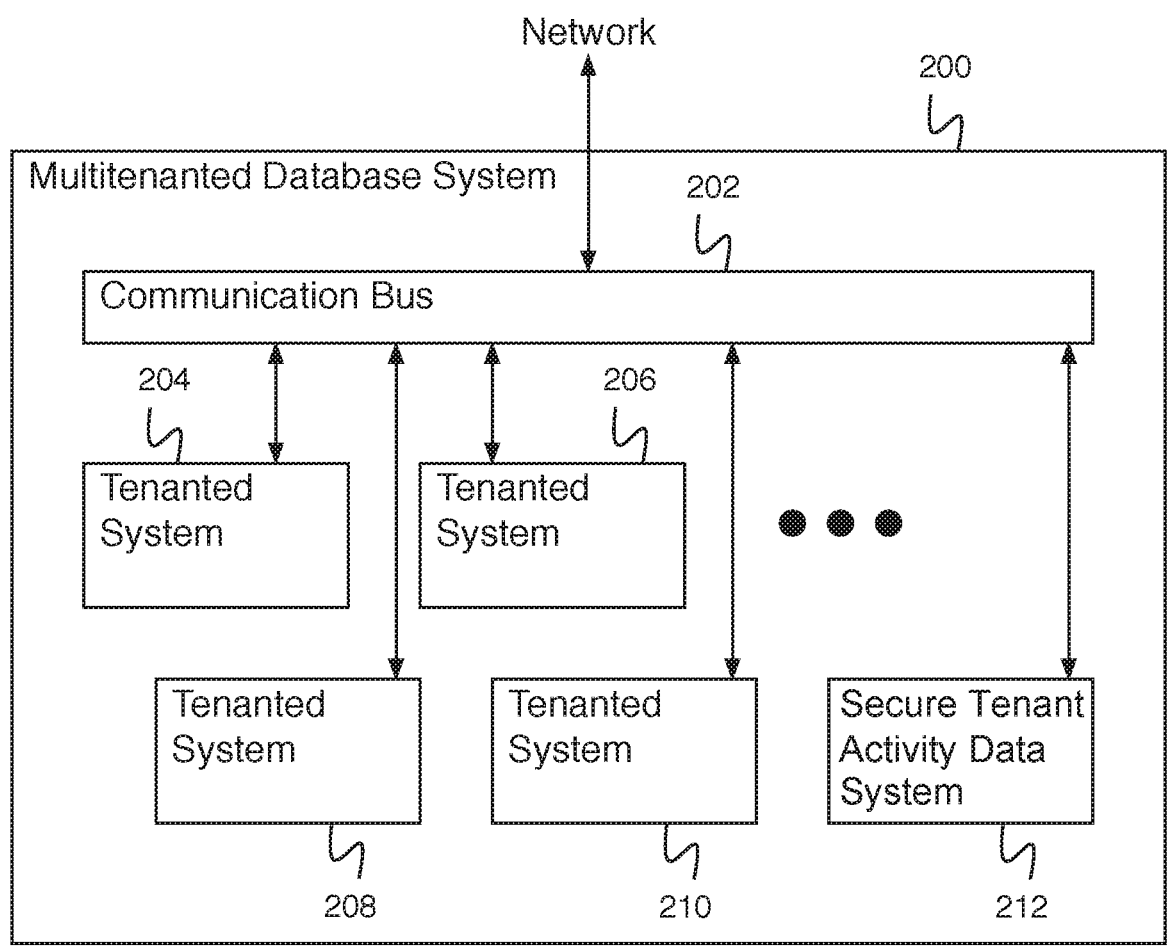
FIG. 2 is a block diagram illustrating an embodiment of a multitenanted database system.

FIG. 2 is a block diagram illustrating an embodiment of a multitenanted database system. In some embodiments, multitenanted database system 200 comprises multitenanted database system 104 of FIG. 1. In the example shown, multitenanted database system 200 comprises communication bus 202 and a plurality of tenanted systems (e.g., tenanted system 204, tenanted system 206, tenanted system 208, and tenanted system 210). Multitenanted database system comprises any appropriate number of tenanted systems (e.g., 1 tenanted system, 2 tenanted systems, 12 tenanted systems, 122 tenanted systems, 1543 tenanted systems, etc.). Communication bus 202 comprises a communication bus for allowing each of the tenanted systems to communicate with a network (e.g., with network 100 of FIG. 1). In some embodiments, communication bus 202 does not allow tenanted systems of multitenanted database system 200 to communicate with each other. Multitenanted database system 200 additionally comprises secure tenant activity data system 212. Secure tenant activity data system 212 comprises a system for processing monitoring data received from the set of tenanted systems using a secure tenant activity data model.

Monitoring data is collected and encrypted by a monitoring instrument installed on a tenanted system and the encrypted monitoring data is provided to secure tenant activity data system 212 (e.g., via communication bus 202). In some embodiments, secure tenant activity data system 212 is configured to provide the monitoring instrument for installation on a tenant system or cause installation of the monitoring instrument on a tenant system.

Secure tenant activity data system 212 receives the encrypted monitoring data and processes the encrypted monitoring data using a stream processing system. The stream processing system comprises a system for processing the monitoring data, for example, cleaning the data, filtering the data, smoothing the data, rounding the data, processing the data using an algorithm, computing features for machine learning, improving ranking of results, improved navigation, generating recommendations, generating metrics, etc. The stream processing system receives the encrypted monitoring data, decrypts the encrypted monitoring data to recover the monitoring data for stream processing, stream processes the monitoring data to determine stream processed monitoring data, and encrypts the monitoring data to determine encrypted stream processed monitoring data. The encrypted stream processed monitoring data is stored in a secure storage area of secure tenant activity data system 212 associated with a tenant identifier (e.g., identifying the tenant from which the data originated). The encrypted stream processed monitoring data is additionally provided to a deployment system for further processing. The deployment system comprises a machine learning model builder—for example, a neural network training system, a recently used data determiner, an explicit algorithm, or any other appropriate deployment system.

Figure 3:
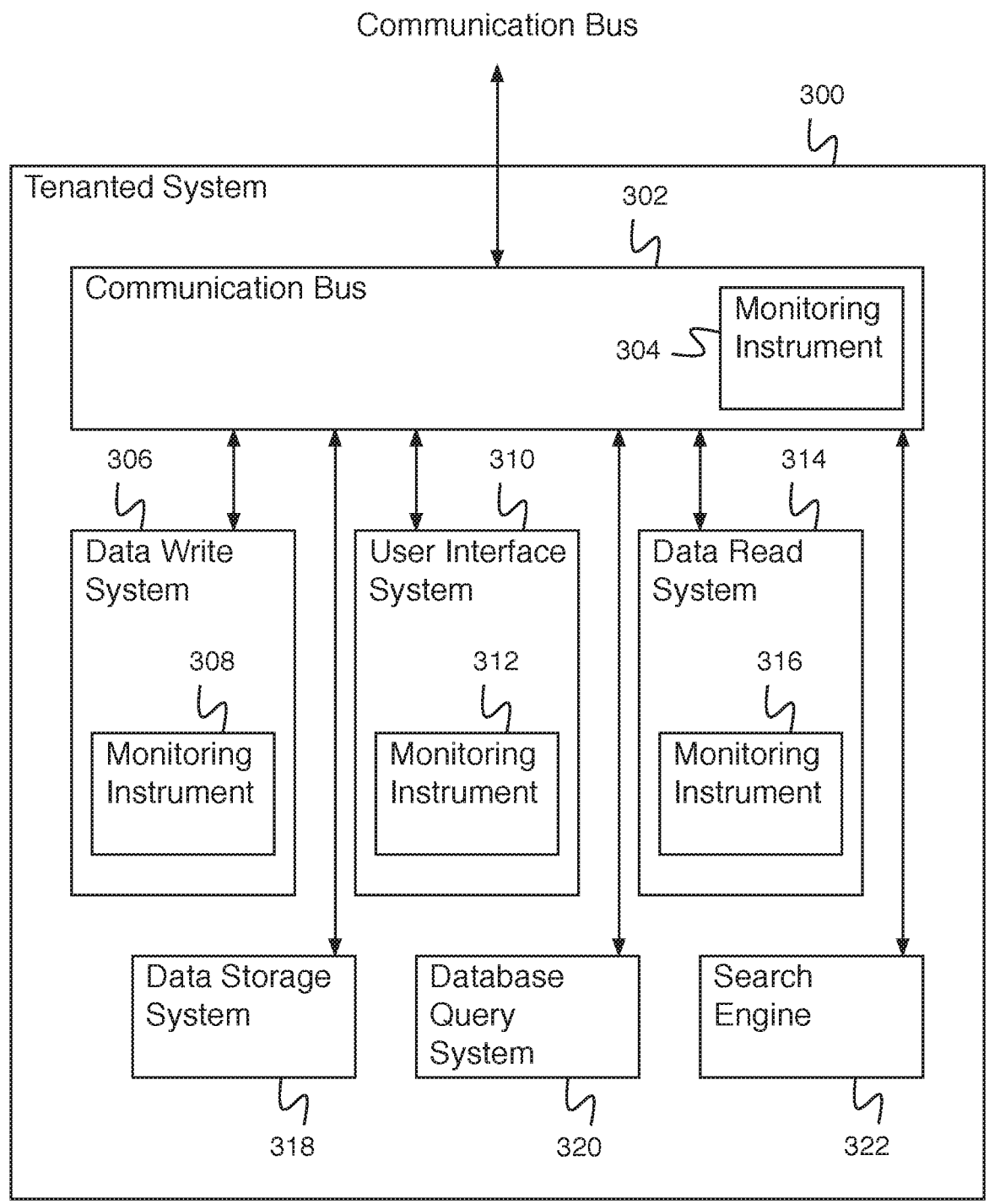
FIG. 3 is a block diagram illustrating an embodiment of a tenanted system.

FIG. 3 is a block diagram illustrating an embodiment of a tenanted system. In some embodiments, tenanted system 300 of FIG. 3 comprises a tenanted system of FIG. 2 (e.g., tenanted system 204 of FIG. 2). In the example shown, tenanted system 300 comprises communication bus 302, data write system 306, user interface system 310, data read system 314, data storage system 318, database query system 320, and search engine 322. Communication bus 302 comprises a system for allowing the other systems of tenanted system 300 to communicate with each other and with a communication bus of a multitenanted database system (e.g., for communicating with a secure tenant activity data system or a network for communicating with other systems). Communication bus 302 comprises monitoring instrument 304 for capturing monitoring data from communications between systems of tenanted system 300. Data storage system 318 comprises a data storage system for storing tenant data. Data write system 306 comprises a system for performing write operations on tenant data stored by data storage system 318. For example, a write operation comprises a write lock operation, a data write operation, a data verify operation, and an unlock operation. A write lock operation locks the data storage system to prevent any other read or write operations from occurring while the write lock is in place. Data write system 306 comprises monitoring instrument 308 for capturing monitoring data during data write system operations. User interface system 310 comprises a user interface system for providing a user interface to a user (e.g., a user interface for reading data, writing data, executing applications, executing reporting, requesting a model, using a model, etc.). User interface system 310 comprises monitoring instrument 312 for capturing monitoring data during user interface system operations. Data read system 314 comprises a system for performing read operations on tenant data stored by data storage system 318. For example, a read operation comprises a read lock operation, a data read operation, and an unlock operation. A read lock operation locks the data storage system to prevent write operations from occurring while the read lock is in place. Multiple read operations can occur simultaneously. Data read system 314 comprises monitoring instrument 316 for capturing monitoring data during data read system operations. Tenanted system 300 comprises any appropriate number of data read systems (e.g., 1 data read system, 4 data read systems, 11 data read systems, etc.). Database query system 320 comprises a system for performing a database query on database data stored by data storage system 318. For example, a database query comprises a SQL (e.g., a structured query language) query. Database query system 320 receives a query from user interface system 310, queries data storage system 318 using the query, determines query results, and provides the query results to user interface system 310. Search engine 322 comprises a system for searching data stored on data storage system 318. For example, search engine 320 comprises an Elasticsearch® search engine algorithm. Search engine 322 receives a search query from user interface system 310, performs the search on data stored on data storage system 318 using the search query, determines search results, and provides the search results to user interface system 310.

In some embodiments, a monitoring instrument of tenanted system 300 injects a transaction identifier (e.g., into a transaction) for tracing or correlating a sequence of monitoring data of a set of monitoring data. For example, monitoring instrument 312 of user interface system 310 injects a transaction identifier into a search request. Further monitoring data collected as a result of the transaction (e.g., monitoring data collected by monitoring instrument 308, monitoring instrument 304, or monitoring instrument 316) will include the transaction identifier. A data aggregator for aggregating data is able to aggregate data based on the transaction identifier (e.g., grouping sets of monitoring data related to the same transaction, e.g., so that they may be analyzed with respect to one another).

Each monitoring instrument of tenanted system 300 (e.g., monitoring instrument 304, monitoring instrument 306, monitoring instrument 308, and monitoring instrument 310) collects a set of monitoring data, encrypts the set of monitoring data to determine an encrypted set of monitoring data, and provides the encrypted set of monitoring data to a secure tenant activity data system (e.g., secure tenant activity data system 212 of FIG. 2). For example, monitoring data of the set of monitoring data comprises stream data, log data, usage data, user input data, user response data, system response data, etc. The secure tenant activity data system receives the encrypted monitoring data and processes the encrypted monitoring data using a stream processing system. The stream processing system comprises a system for processing the monitoring data, for example, cleaning the data, filtering the data, smoothing the data, rounding the data, processing the data using an algorithm, computing features for machine learning, etc. The stream processing system receives the encrypted monitoring data, decrypts the encrypted monitoring data to recover the monitoring data for stream processing, stream processes the monitoring data to determine stream processed monitoring data, and encrypts the monitoring data to determine encrypted stream processed monitoring data. The encrypted stream processed monitoring data is stored in a secure storage area of the secure tenant activity data system associated with a tenant identifier (e.g., identifying the tenant from which the data originated). The encrypted stream processed monitoring data is additionally provided to a deployment system for further processing. The deployment system comprises a machine learning model builder, a neural network training system, a recently used data determiner, an explicit algorithm, or any other appropriate deployment system.

Figure 4:
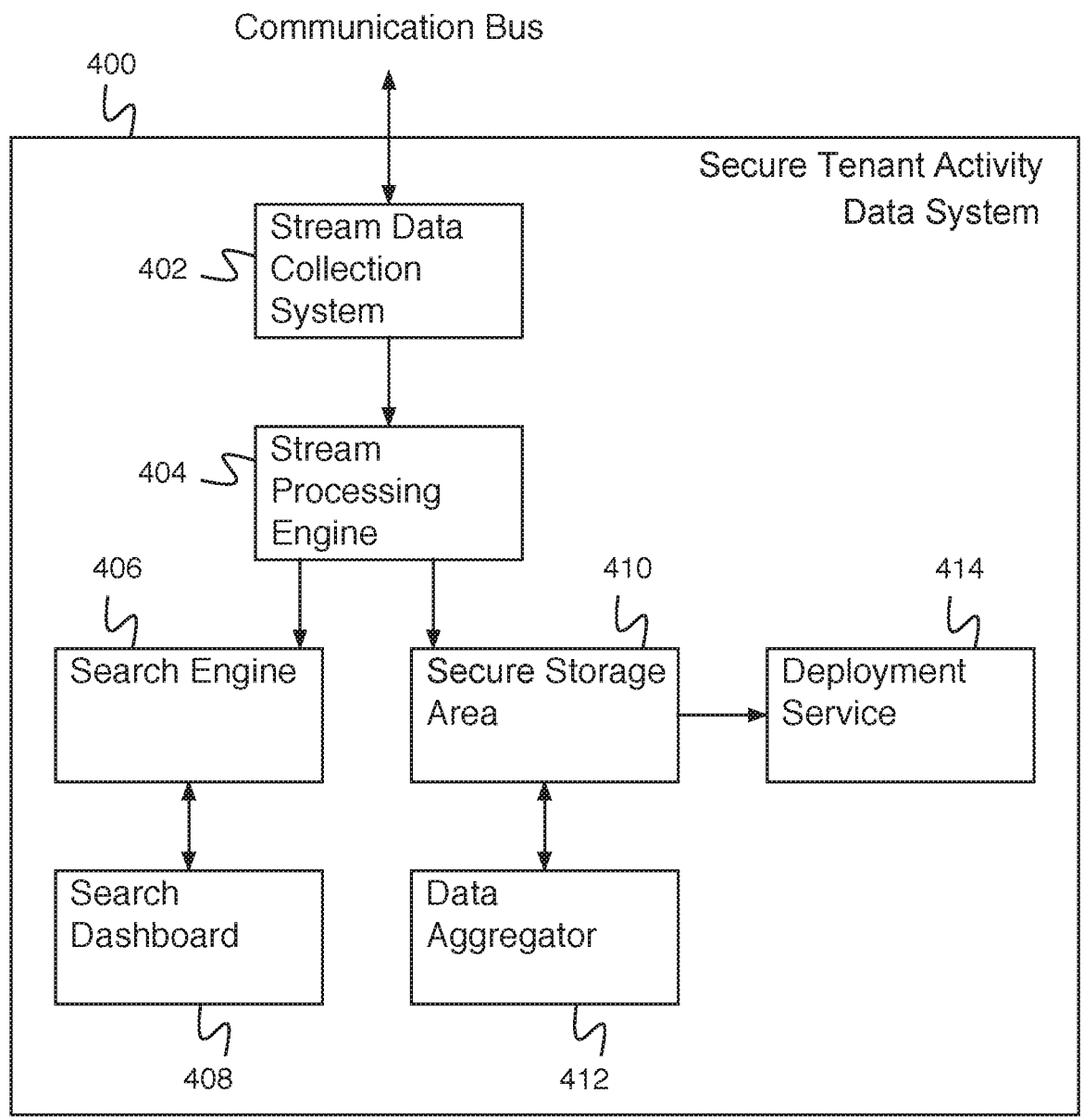
FIG. 4 is a block diagram illustrating an embodiment of a secure tenant activity data system.

FIG. 4 is a block diagram illustrating an embodiment of a secure tenant activity data system. In some embodiments, secure tenant activity data system 400 comprises secure tenant activity data system 212 of FIG. 2. In the example shown, secure tenant activity data system 400 comprises stream data collection system 402. Stream data collection system 402 comprises a system for receiving stream data. For example, stream data collection system 402 comprises a system for receiving a set of encrypted monitoring data from one or more monitoring instruments of a tenant system (e.g., one or more monitoring instruments of the monitoring instruments of FIG. 3), wherein a monitoring instrument collects a set of monitoring data from the tenant system, and wherein the monitoring instrument encrypts the set of monitoring data to create the set of encrypted monitoring data. Stream processing engine 404 comprises a system for processing data to determine a set of stream processed data. For example, stream processing engine 404 comprises a system for one or more of: data cleaning, data rounding, data filtering, data smoothing, algorithmic processing, computation of features for a machine learning system, improving ranking of results, improved navigation, generating recommendations, generating metrics, etc. Stream processing engine 404 additionally comprises a system for decrypting data to recover a set of monitoring data and encrypting stream processed data to determine a set of encrypted stream processed data. Stream processing engine 404 provides encrypted stream processed data to search engine 406 and secure storage area 410. Search engine 406 comprises an Elasticsearch database for correlating and storing user actions and statistics with user search queries. Search engine 406 is used for collecting and storing user actions and statistics related to queries. This use is different from the regular use of a search engine (e.g., that of serving user search queries). For example, search engine 406 comprises an Elasticsearch® algorithm. Search dashboard 408 comprises a dashboard for providing a search engine interface to one or more users. Secure storage area 410 comprises a storage system for storing encrypted stream processed data. Secure storage area 410 stores encrypted tenant data associated with a tenant ID in order to allow the encrypted tenant data to be decrypted by a system qualified to retrieve the decryption key for the tenant data using the tenant ID. Secure storage area 410 communicates with data aggregator 412. Data aggregator 412 comprises a data aggregator for aggregating related data into an aggregated data set. For example, data aggregator 412 aggregates data based at least in part on a transaction identifier associated with the data. Data aggregator 412 is able to decrypt data for aggregation (e.g., based at least in part on a tenant ID associated with the data) when necessary. In some embodiments, data aggregator 412 receives data, determines related data, requests the related data, aggregates the data with the related data to form aggregated data, and provides the aggregated data to secure storage area 410 for aggregation. Secure storage area 410 provides data to deployment service 414. Deployment service 414 comprises a service for deploying data, systems built from data, services, applications, etc. For example, deployment service 414 comprises a machine learning model builder, a neural network training algorithm, an explicit algorithm, or a recently used data determiner. In some embodiments, the deployment service deploys services or applications to the tenant system of a plurality of tenant systems (e.g., of a multitenanted database system) from which secure tenant activity data system 400 received the set of encrypted monitoring data. In some embodiments, the deployment service deploys services or applications to another tenant system of the plurality of tenant systems.

Figure 5:
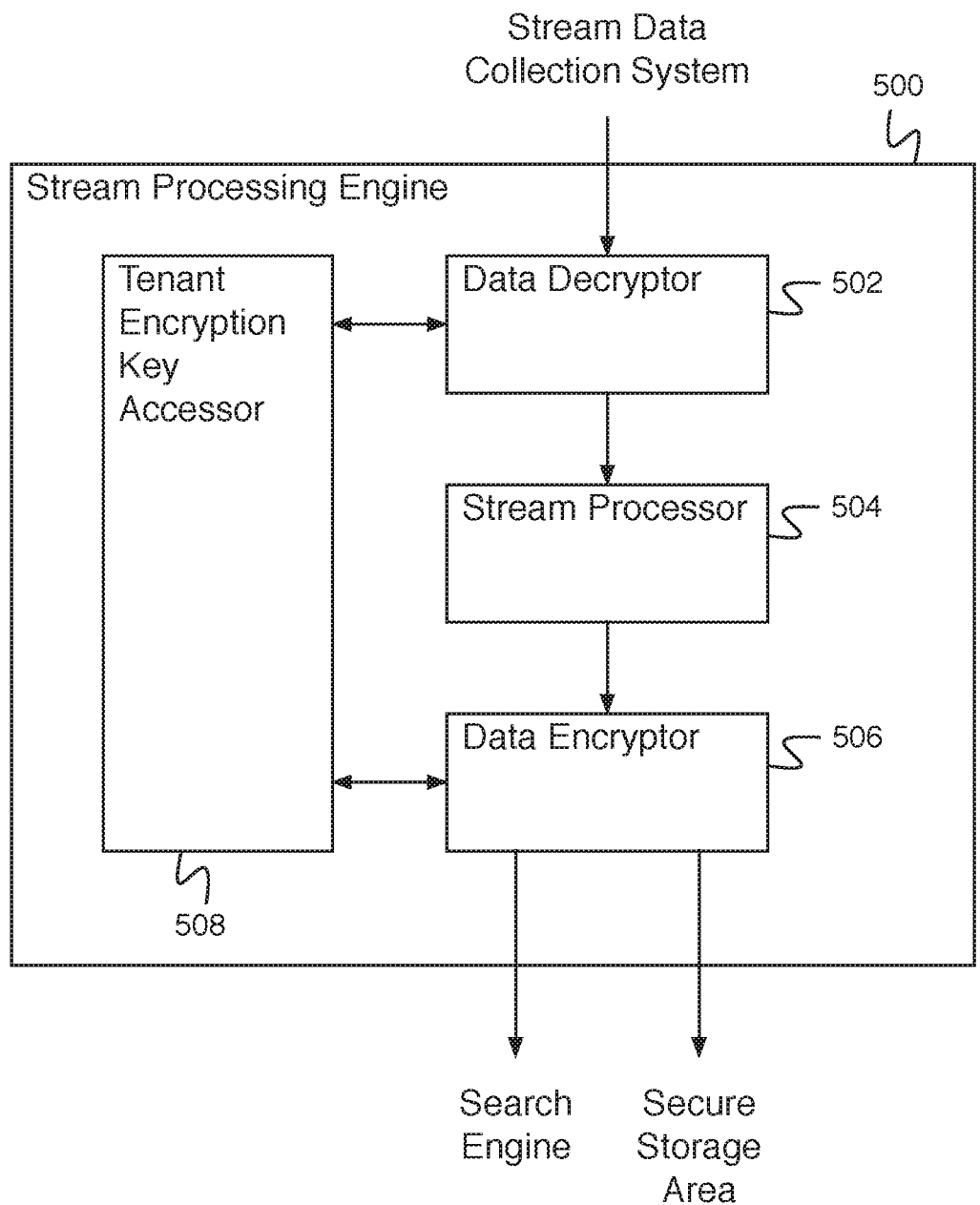
FIG. 5 is a flow diagram illustrating an embodiment of a stream processing engine.

FIG. 5 is a flow diagram illustrating an embodiment of a stream processing engine. In some embodiments, stream processing engine 500 of FIG. 5 comprises stream processing engine 404 of FIG. 4. In the example shown, stream processing engine 500 comprises data decryptor 502, stream processor 504, and data encryptor 506. Data decryptor 502 comprises a data decryptor for decrypting data. Stream processor 504 comprises a stream processor for processing data to determine stream processed data. Data encryptor 506 comprises a data encryptor for determining encrypted stream processed data. Data encryptor 506 provides the encrypted stream processed data to one or more external systems (e.g., a search engine and a secure storage area). Tenant encryption key accessor 508 comprises a system for accessing a tenant encryption key. Tenant encryption key accessor 508 determines a tenant associated with the data and accesses an encryption key database to access the encryption key associated with the tenant for decrypting the data.

Figure 6:
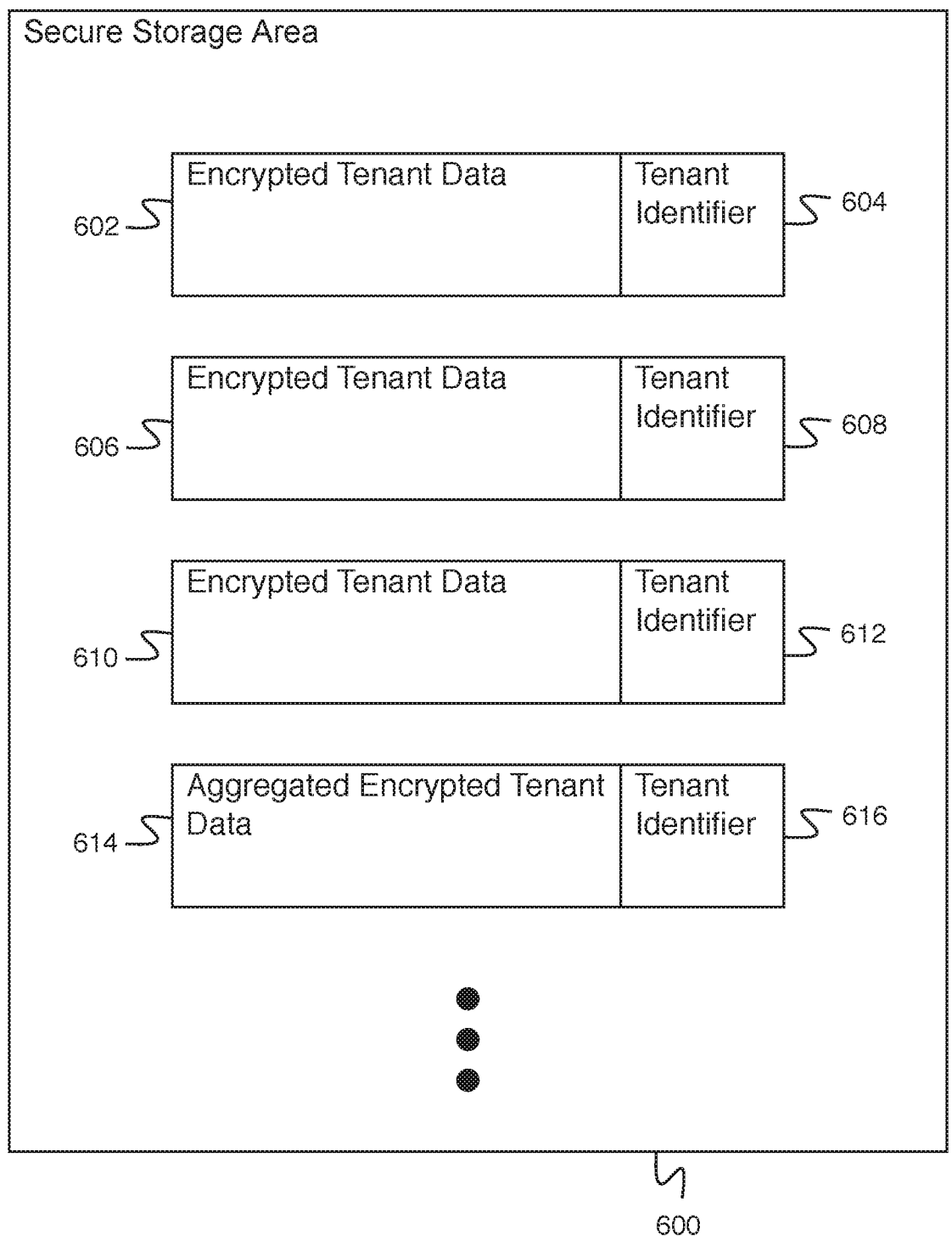
FIG. 6 is a block diagram illustrating an embodiment of a secure storage area.

FIG. 6 is a block diagram illustrating an embodiment of a secure storage area. In some embodiments, secure storage area 600 comprises secure storage area 410 of FIG. 4. In the example shown, secure storage area 600 comprises a plurality of encrypted tenant data (e.g., encrypted tenant data 602, encrypted tenant data 606, encrypted tenant data 610). Encrypted tenant data comprises data received from a monitoring instrument or data received from a stream processor (e.g., encrypted stream processed data). Secure storage area 600 additionally comprises aggregated encrypted tenant data 614. Aggregated encrypted tenant data comprises encrypted tenant data that has been aggregated by a data aggregator (e.g., data aggregator 412 of FIG. 4). For example, aggregated data comprises data aggregated based at least in part on a common transaction identifier. Data in secure storage area 600 is stored associated with a tenant identifier. A tenant identifier indicates a tenant associated with the data and can be used to identify an encryption key for decrypting the data. For example, encrypted tenant data 602 is associated with tenant identifier 604, encrypted tenant data 606 is associated with tenant identifier 608, encrypted tenant data 610 is associated with tenant identifier 612, and aggregated encrypted tenant data 614 is associated with tenant identifier 616. In some embodiments, a tenant identifier is stored as metadata linked to a set of encrypted monitoring data.

Figure 7:
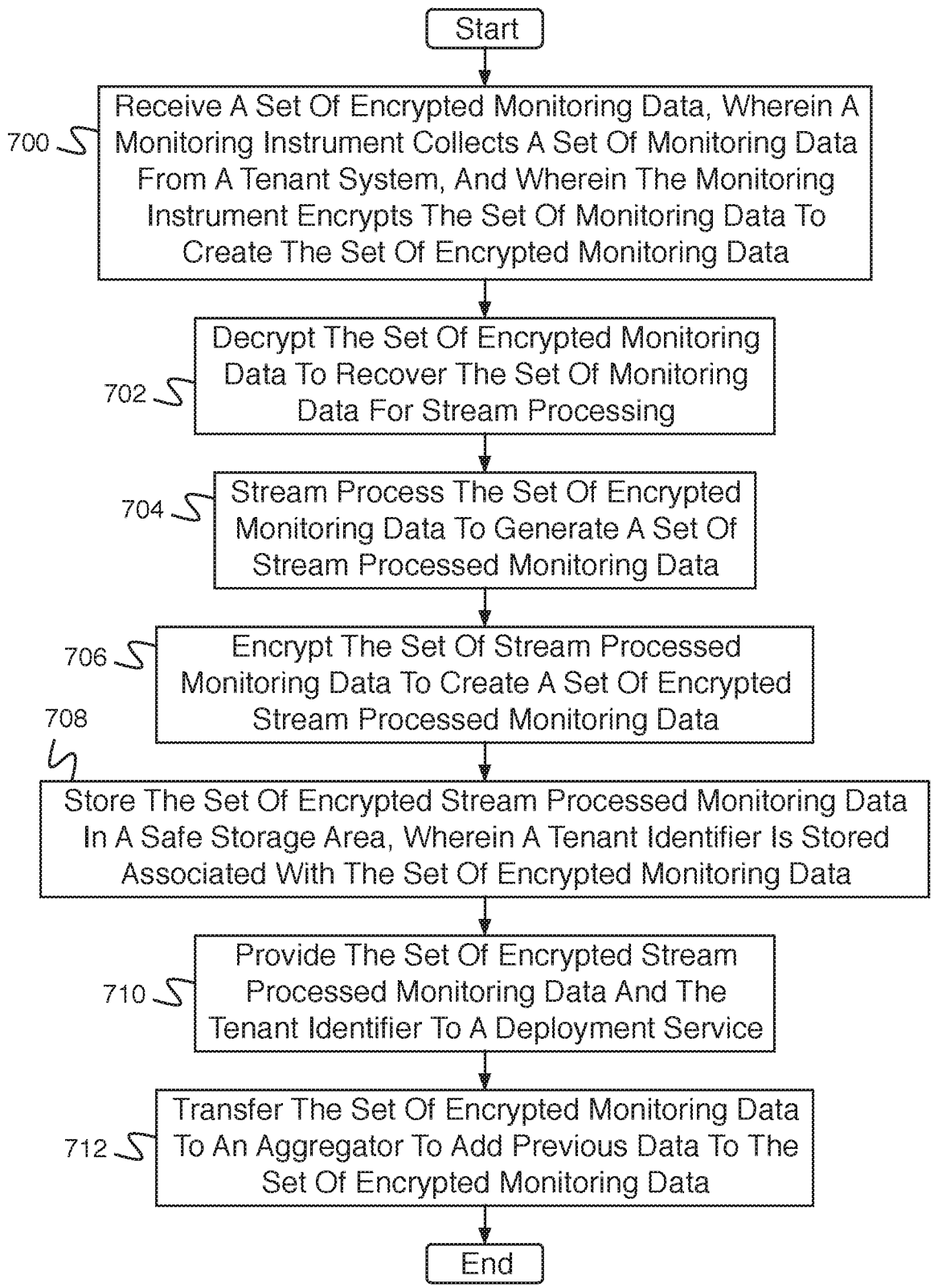
FIG. 7 is a flow diagram illustrating an embodiment of a process for a secure tenant activity data system for a deployment service.

FIG. 7 is a flow diagram illustrating an embodiment of a process for a secure tenant activity data system for a deployment service. In some embodiments, the process of FIG. 7 is executed by secure tenant activity data system 400 of FIG. 4. In the example shown, in 700, a set of encrypted monitoring data is received, wherein a monitoring instrument collects a set of monitoring data from a tenant system, and wherein the monitoring instrument encrypts the set of monitoring data to create the set of encrypted monitoring data. In 702, the set of encrypted monitoring data is decrypted to recover the set of monitoring data for stream processing. For example, the set of encrypted monitoring data is decrypted using a decryption key associated with the tenant system, for example, using a decryption key determined based at least in part on a tenant identifier. In 704, the set of encrypted monitoring data is stream processed to generate a set of stream processed monitoring data. In various embodiments, stream processing comprises one or more of data cleaning, data rounding, data filtering, data smoothing, algorithmic processing, computation of features for a machine learning system, improving ranking of results, improved navigation, generating recommendations, generating metrics, etc. In 706, the set of stream processed monitoring data is encrypted to create a set of encrypted stream processed monitoring data. For example, the set of encrypted monitoring data is encrypted using an encryption key associated with the tenant system, for example, using an encryption key determined based at least in part on a tenant identifier. In 708, the set of encrypted stream processed monitoring data is stored in a secure storage area, wherein a tenant identifier is stored associated with the set of encrypted monitoring data. In 710, the set of encrypted stream processed monitoring data and the tenant identifier are provided to a deployment service. In 712, the set of encrypted monitoring data is transferred to an aggregator to add previous data to the set of encrypted monitoring data. For example, previous data comprises previous aggregated encrypted monitoring data, previous data determined based at least in part on a transaction identifier, etc. A transaction identifier comprises a transaction identifier injected by a monitoring instrument (e.g., the monitoring instrument that collected the set of monitoring data, a different monitoring instrument of the tenanted system, etc.). In some embodiments, the encrypted monitoring data is stored including the previous data (e.g., aggregated data comprising the set of encrypted monitoring data and the previous data is received from the aggregator and stored).

In some embodiments, the tenant identifier is received with the set of encrypted monitoring data (e.g., the monitoring instrument providing the data set appends the tenant identifier to the data). In some embodiments, the tenant identifier is derived from a source of the set of encrypted monitoring data (e.g., a communication bus of a multitenanted database system communicating a set of encrypted monitoring data from a tenanted system to a secure tenant activity data system includes with the set of encrypted monitoring data an indication of the tenant system providing the encrypted monitoring data).

Figure 8:
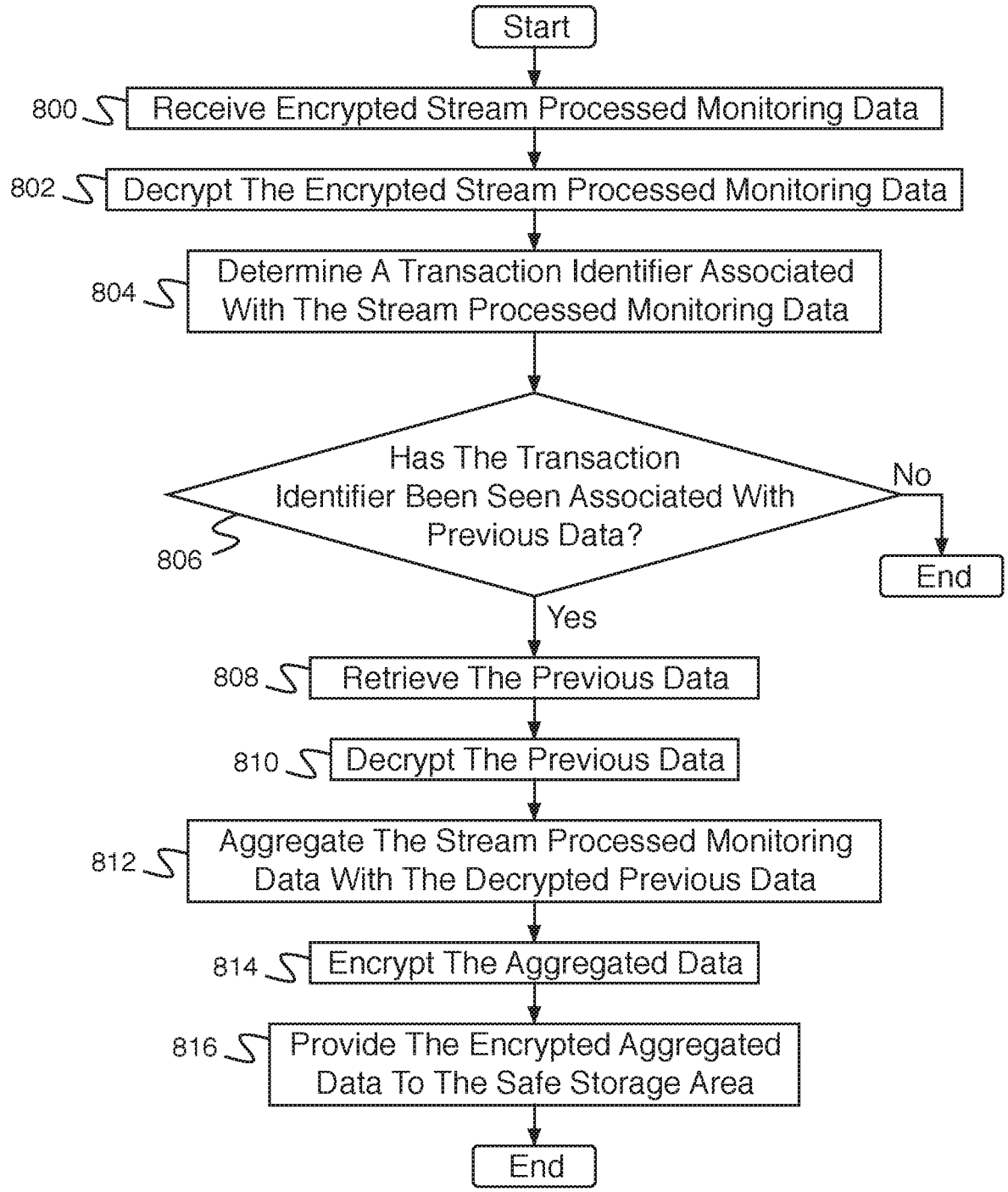
FIG. 8 is a flow diagram illustrating an embodiment of a process for aggregating data.

FIG. 8 is a flow diagram illustrating an embodiment of a process for aggregating data. In some embodiments, the process of FIG. 8 is executed by a data aggregator of a secure tenant activity data system (e.g., data aggregator 412 of FIG. 4). In the example shown, in 800, encrypted stream processed monitoring data is received. The encrypted stream processed monitoring data comprises data for aggregating. For example, aggregating data comprises determining previous related data and aggregating the data with the previous related data. In 802, the encrypted stream processed monitoring data is decrypted (e.g., using a decryption key associated with a tenant system, e.g., determined based at least in part on a tenant identifier). In 804, a transaction identifier associated with the stream processed monitoring data is determined. For example, a transaction identifier comprises a transaction identifier injected by a monitoring instrument for the purposes of identifying data associated with a single transaction. In 806, it is determined whether the transaction identifier has been seen associated with previous data. In the event it is determined that the transaction identifier has not been seen associated with previous data, the process ends (e.g., there is no data to aggregate). In the event it is determined that the transaction identifier has been seen associated with previous data, control passes to 808. In 808, the previous data is retrieved (e.g., from a secure storage area). In 810, the previous data is decrypted (e.g., using a decryption key associated with a tenant identifier associated with the previous data, using the same decryption key used in 802, etc.). In 812, the stream processed monitoring data is aggregated with the decrypted previous data. In 814, the aggregated data is encrypted. In 816, the encrypted aggregated data is provided to the secure storage area.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A secure tenant activity data system, comprising:
   a hardware processor; and
   a hardware memory coupled with the hardware processor, wherein the hardware memory is configured to provide the hardware processor with instructions which when executed cause the hardware processor to:
      receive a set of encrypted monitoring data,
         wherein a monitoring instrument collects a set of monitoring data from a tenant system, wherein monitoring data of the set of monitoring data relate to actions of a user associated with the tenant system, and wherein the monitoring data comprises three or more of the following: usage data, user input data, user response data, user interaction data, or system response data; and
         wherein the monitoring instrument encrypts the set of monitoring data to create the set of encrypted monitoring data;
      decrypt the set of encrypted monitoring data to recover the set of monitoring data for stream processing;
      stream process the set of monitoring data to generate a set of stream processed monitoring data, wherein the stream processing comprises three or more of data cleaning, data filtering, data smoothing, improving ranking of results, improved navigation, generating recommendations, generating metrics, or computation of features for a machine learning system;
      encrypt the set of stream processed monitoring data to create a set of encrypted stream processed monitoring data;
      store the set of encrypted stream processed monitoring data in a secure storage area,
         wherein a tenant identifier is stored associated with the set of encrypted stream processed monitoring data in order to allow the set of encrypted stream processed monitoring data to be decrypted by retrieving a decryption key for the set of encrypted stream processed monitoring data using the tenant identifier, wherein the tenant identifier is stored as metadata linked to the set of encrypted monitoring data;
      provide the set of encrypted stream processed monitoring data and the tenant identifier to a deployment service, wherein the deployment service comprises a machine learning model builder; and
      add previous data to the set of encrypted stream processed monitoring data based at least in part on a transaction identifier associated with the set of encrypted stream processed monitoring data and the previous data, wherein the monitoring instrument injects the transaction identifier for tracing and correlating a sequence of monitoring data of the set of monitoring data.

2. The secure tenant activity data system of claim 1, wherein the monitoring instrument provides the set of encrypted monitoring data.

3. The secure tenant activity data system of claim 1, wherein the hardware processor is further configured to provide the monitoring instrument for installation or to cause installation of the monitoring instrument.

4. The secure tenant activity data system of claim 1, wherein decrypting the set of encrypted monitoring data uses a key associated with the tenant system.

5. The secure tenant activity data system of claim 1, wherein encrypting the set of stream processed monitoring data uses a key associated with the tenant system.

6. The secure tenant activity data system of claim 1, wherein the tenant identifier is received with the set of encrypted monitoring data.

7. The secure tenant activity data system of claim 1, wherein the tenant identifier is derived from a source of the set of encrypted monitoring data.

8. The secure tenant activity data system of claim 1, wherein the previous data comprises previous aggregated encrypted monitoring data.

9. The secure tenant activity data system of claim 1, wherein the previous data is determined based at least in part on the transaction identifier.

10. The secure tenant activity data system of claim 1, wherein the set of encrypted monitoring data is stored including the previous data.

11. The secure tenant activity data system of claim 1, wherein the tenant system is one of a plurality of tenant systems.

12. The secure tenant activity data system of claim 11, wherein the deployment service deploys services or applications to the tenant system of the plurality of tenant systems.

13. The secure tenant activity data system of claim 11, wherein the deployment service deploys services or applications to another tenant system of the plurality of tenant systems.

14. A method for a secure tenant activity data system, comprising:
  receiving a set of encrypted monitoring data,
    wherein a monitoring instrument collects a set of monitoring data from a tenant system, wherein monitoring data of the set of monitoring data relate to actions of a user associated with the tenant system, and wherein the monitoring data comprises three or more of the following: usage data, user input data, user response data, user interaction data, or system response data; and
    wherein the monitoring instrument encrypts the set of monitoring data to create the set of encrypted monitoring data;
  decrypting, using a processor, the set of encrypted monitoring data to recover the set of monitoring data for stream processing;
  stream processing the set of monitoring data to generate a set of stream processed monitoring data, wherein the stream processing comprises three or more of data cleaning, data filtering, data smoothing, improving ranking of results, improved navigation, generating recommendations, generating metrics, or computation of features for a machine learning system;
  encrypting the set of stream processed monitoring data to create a set of encrypted stream processed monitoring data;
  storing the set of encrypted stream processed monitoring data in a secure storage area,
    wherein a tenant identifier is stored associated with the set of encrypted stream processed monitoring data in order to allow the set of encrypted stream processed monitoring data to be decrypted by retrieving a decryption key for the set of encrypted stream processed monitoring data using the tenant identifier, wherein the tenant identifier is stored as metadata linked to the set of encrypted monitoring data;
  providing the set of encrypted stream processed monitoring data and the tenant identifier to a deployment service, wherein the deployment service comprises a machine learning model builder; and
  adding previous data to the set of encrypted stream processed monitoring data based at least in part on a transaction identifier associated with the set of encrypted stream processed monitoring data and the previous data, wherein the monitoring instrument injects the transaction identifier for tracing and correlating a sequence of monitoring data of the set of monitoring data.

15. A computer program product for a secure tenant activity data system, the computer program product being embodied in a non-transitory computer readable storage medium and comprising computer instructions for:
  receiving a set of encrypted monitoring data,
    wherein a monitoring instrument collects a set of monitoring data from a tenant system, wherein monitoring data of the set of monitoring data relate to actions of a user associated with the tenant system, and wherein the monitoring data comprises three or more of the following: usage data, user input data, user response data, user interaction data, or system response data; and
    wherein the monitoring instrument encrypts the set of monitoring data to create the set of encrypted monitoring data;
  decrypting the set of encrypted monitoring data to recover the set of monitoring data for stream processing;
  stream processing the set of monitoring data to generate a set of stream processed monitoring data, wherein the stream processing comprises three or more of data cleaning, data filtering, data smoothing, improving ranking of results, improved navigation, generating recommendations, generating metrics, or computation of features for a machine learning system;
  encrypting the set of stream processed monitoring data to create a set of encrypted stream processed monitoring data;
  storing the set of encrypted stream processed monitoring data in a secure storage area,
    wherein a tenant identifier is stored associated with the set of encrypted stream processed monitoring data in order to allow the set of encrypted stream processed monitoring data to be decrypted by retrieving a decryption key for the set of encrypted stream processed monitoring data using the tenant identifier, wherein the tenant identifier is stored as metadata linked to the set of encrypted monitoring data;
  providing the set of encrypted stream processed monitoring data and the tenant identifier to a deployment service, wherein the deployment service comprises a machine learning model builder; and adding previous data to the set of encrypted stream processed monitoring data based at least in part on a transaction identifier associated with the set of encrypted stream processed monitoring data and the previous data, wherein the monitoring instrument injects the transaction identifier for tracing and correlating a sequence of monitoring data of the set of monitoring data.

* * * * *